United States Patent [19]

Baliozian

[11] 4,428,030
[45] Jan. 24, 1984

[54] MODULAR LIGHT-DIFFUSING OR REFLECTING PLASTIC PANEL

[75] Inventor: Mardick Baliozian, Larchmont, N.Y.

[73] Assignee: Tekno AG, Zurich, Switzerland

[21] Appl. No.: 436,450

[22] Filed: Oct. 25, 1982

[30] Foreign Application Priority Data

Oct. 23, 1981 [FR] France .............................. 81 19898

[51] Int. Cl.³ .............................................. G03B 15/02
[52] U.S. Cl. ..................................... 362/18; 362/235;
362/297; 362/301; 362/310; 362/320; 362/346;
362/352; 362/360; 362/362
[58] Field of Search ................. 362/18, 235, 310, 297,
362/301, 320, 346, 352, 360, 362

[56] References Cited

U.S. PATENT DOCUMENTS 2,907,873 10/1959 Smith ................................. 362/320

Primary Examiner—Stephen J. Lechert, Jr.
Attorney, Agent, or Firm—Young & Thompson

[57] ABSTRACT

This modular light-diffusing or reflecting plastic panel, notably for photography, motion-picture and television, comprises a cut panel (1), of semi-rigid material having formed therein by pressing a series of grooves (2, 3, 4), oriented to permit the folding of the panel (1) in different planes in order to impart a three-dimensional configuration thereto with multiple faces; folding tabs and tongues (8, 9, 12) are formed along the panel periphery for assembling it with other similar panels or closing the panel. Various three-dimensional configurations may be given to this panel while preserving its stability in the upright position on a horizontal planar surface. This panel is very light in weight and capable of diffusing or reflecting light in all possible angular directions.

9 Claims, 10 Drawing Figures

U.S. Patent  Jan. 24, 1984  Sheet 1 of 3  4,428,030
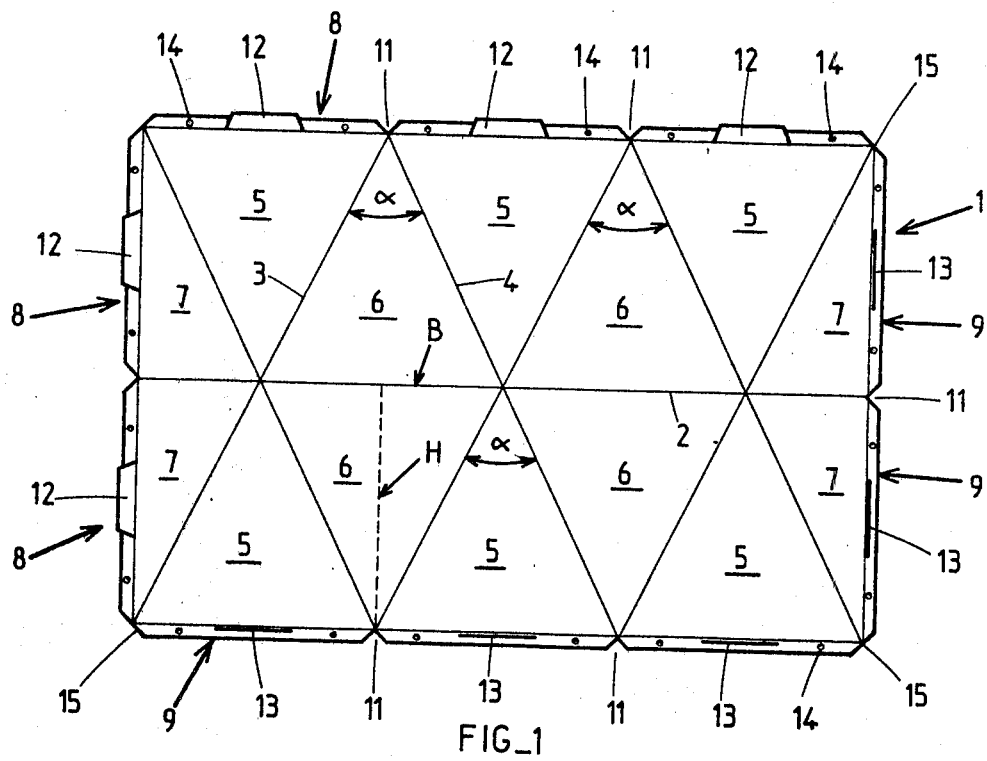
FIG_1
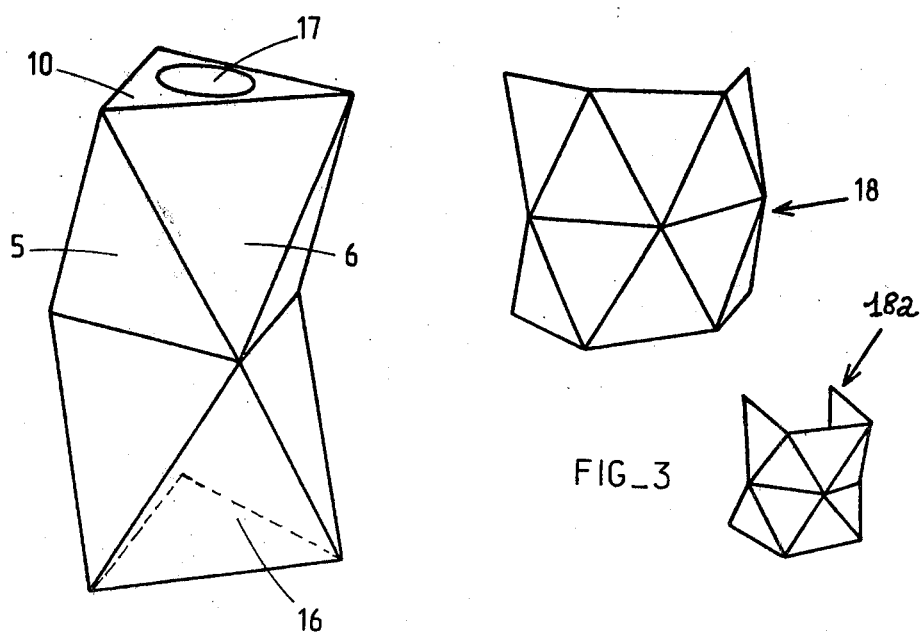
FIG_2
FIG_3

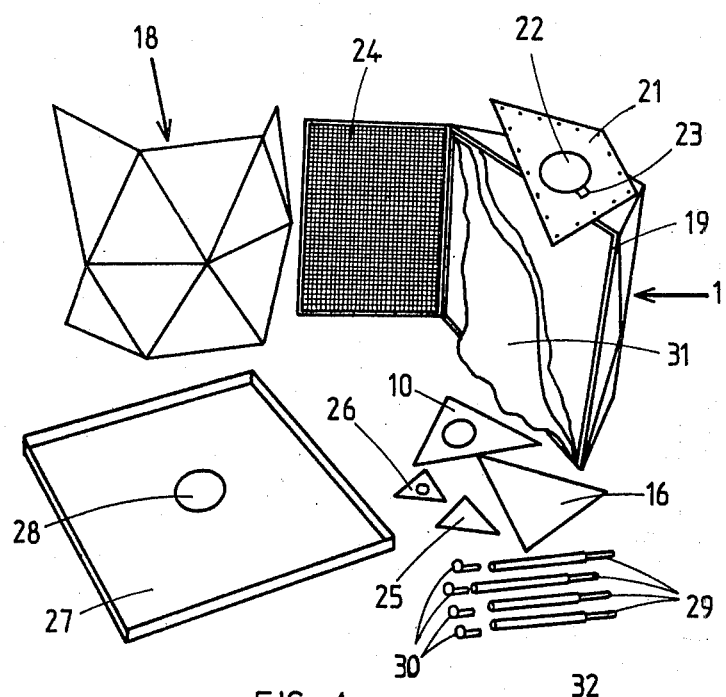
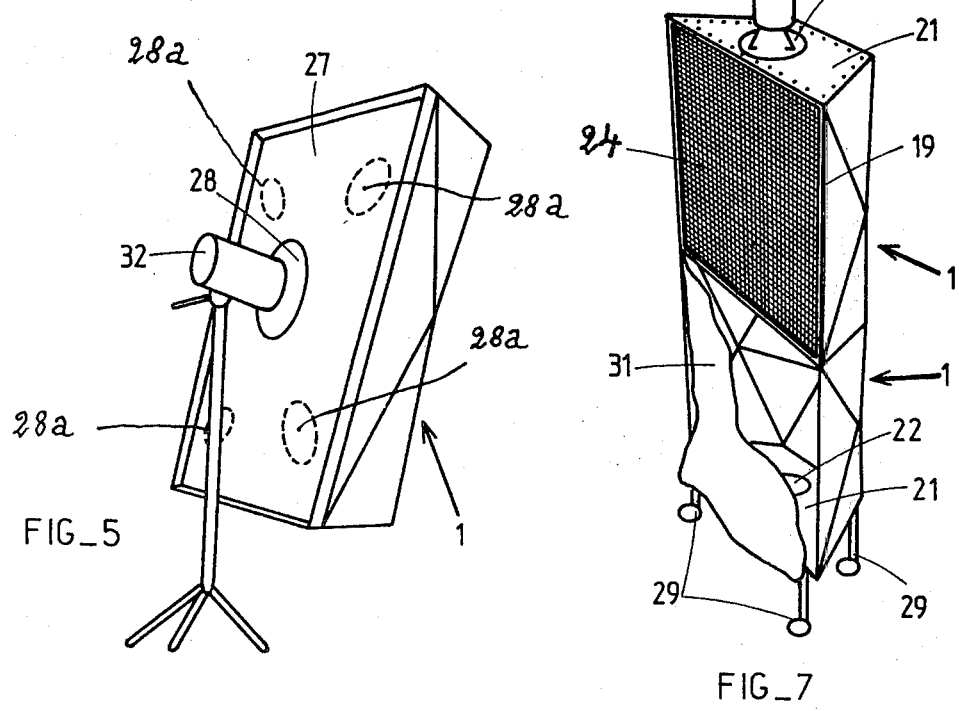

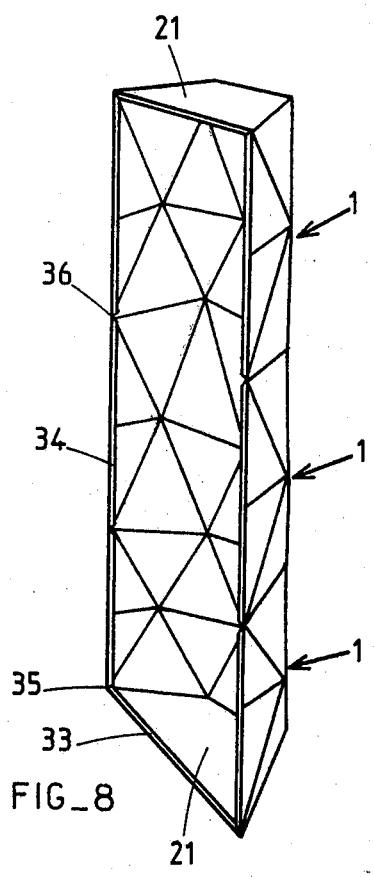
FIG_8
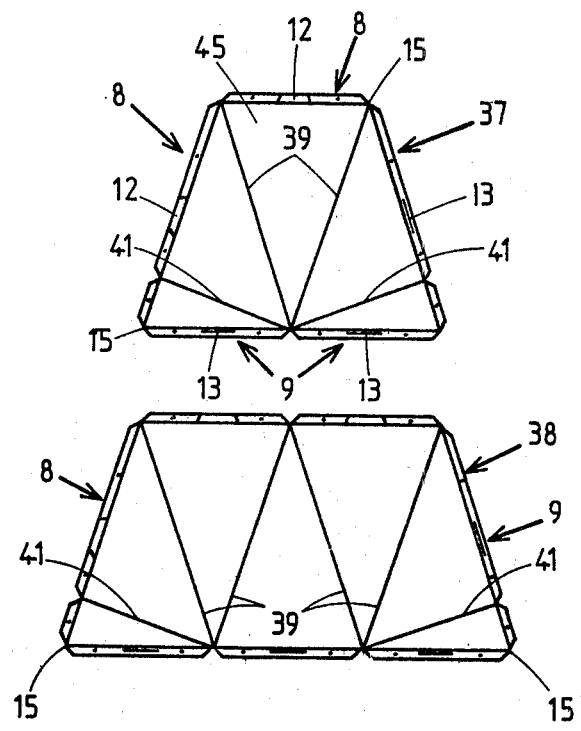
FIG_9
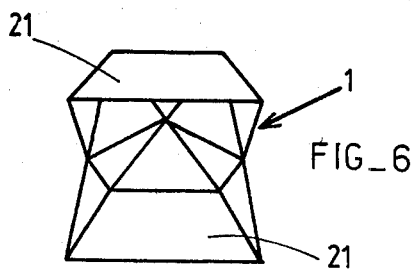
FIG_6
FIG_11
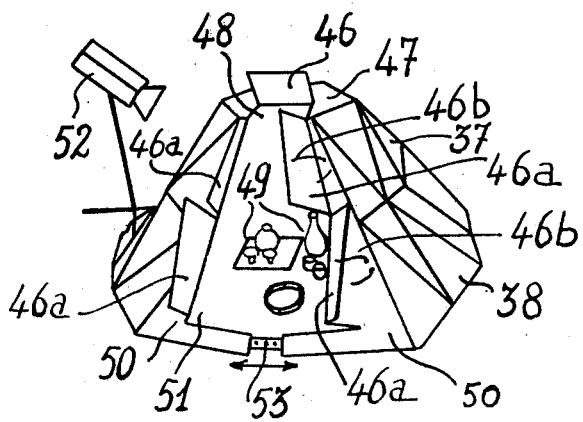
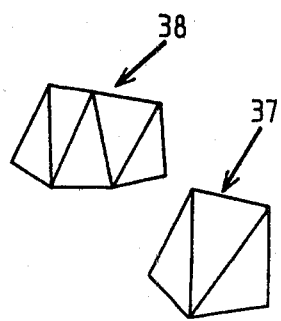
FIG_10

MODULAR LIGHT-DIFFUSING OR REFLECTING PLASTIC PANEL

BACKGROUND OF THE INVENTION

The present invention is directed to provide an improved modular light-diffusing or reflecting plastic panel for photographic, motion-picture, television and zonal lighting applications, and also a device consisting of a plurality of such panels assembled for similar applications.

It is known that when it is desired to obtain a shadowless illumination or an illumination producing only very diffused shadows, the light must illuminate the subject uniformly through a very wide angle, so that the light source proper must be as large as, or considerably larger than, the subject.

THE PRIOR ART

Various types of devices have already been proposed for constituting a light source capable of meeting the above-mentioned requirements. Thus, according to a first known method, a relatively great number of small contiguous light sources are used. However, this arrangement is particularly expensive since each light source entails the use of separate leads and a reflector. Moreover, the considerable number of point sources of light produce multiple shadows, and finally costly racks are necessary for supporting these sources.

It is also known to use large flat reflecting panels, but the mere fact that these panels are flat makes it necessary to provide some means for supporting them. In addition, such flat panels are difficult to move from one place to another, and the illumination obtained with reflectors of this type is always rather dull, with a moderate possibility of controlling the angle from the source to the illuminated area and the acuity of the shadow.

In some applications light diffusing cones are used but they are objectionable in that a photograph can be taken only from the vertex of the cone, in the absence of any other apertures, and furthermore this device is expensive, heavy, cumbersome and therefore difficult to handle and transport.

So-called 'light boxes' are also known which comprise fabric-lined reflecting walls. However, these boxes require a supporting structure for keeping the fabric in position and in the desired shape. Other known light boxes have rigid walls for example of light alloy and a pyramidal configuration. These boxes are rather expensive and heavy, and costly mechanical means are necessary for holding them in position.

SUMMARY OF THE INVENTION

It is the primary object of the present invention to provide a modular panel constituting an advantageous substitute for all the prior art devices briefly mentioned hereinabove, this improved device being not only free of all the inconveniences characterizing said devices but also capable of diffusing or reflecting light and acting as a light box.

According to this invention, the modular plastic light-diffusing or reflecting plastic panel for photographic, motion-picture, television and zonal lighting applications according to this invention consists of a plate of semi-rigid material in which a series of grooves are pressed to form a pattern such that the panel can be folded therealong in different planes, thus providing a plurality of faces and imparting to the panel itself a rigidity sufficient to make it stable when supported by a horizontal flat surface, means being provided on the outer periphery of the panel for facilitating either the assembling thereof with at least one panel of same or similar configuration, or the fixing of suitable accessories, notably frames, grid-spots, filters and the like.

A suitable plastic material is used for making the modular panels of the present invention and its thickness is small enough to reduce appreciably the weight of the panel but sufficient to impart thereto the rigidity necessary for keeping it in the desired upright position, when properly folded, on a horizontal surface, that is, without resorting to any external supporting or retaining structure.

Since the panel of this invention is a modular one, it can be assembled with one or more other similar panels for obtaining an assembly surrounding more or less the subject to be photographed or filmed. This assembly may have various configurations and dimensions as a function of the specific geometry and type of modular panels implemented.

Thus, the panel may have a rectangular or trapezoidal contour. If trapezoidal panels are used, it is possible, by assembling a plurality of properly folded or superposed panels of this type, to construct a kind of 'igloo' into which the subject to be photographed or filmed is introduced, an aperture being provided in the wall of the igloo for photographing the subject enclosed therein, the light source or sources being disposed externally of the igloo.

Other features and advantages of the invention will appear as the following description proceeds with reference to the accompanying drawings illustrating diagrammatically by way of example possible forms of embodiment of the invention.

THE DRAWINGS

FIG. 1 is a plan view showing a first form of embodiment of a modular plastic light-diffusing or reflecting panel according to the invention, which in this case is a rectangular panel;

FIG. 2 is a perspective view of a panel according to FIG. 1, folded to constitute a closed volume;

FIG. 3 is a perspective view of two panels of the type shown in FIG. 1 but having different dimensions and folded to provide a free face and to stay upright by itself on a horizontal flat surface;

FIG. 4 is a perspective view showing a modular panel of the type illustrated in FIG. 1, in its open condition, together with a plurality of accessories adapted to be used in conjunction with this panel;

FIGS. 5 and 6 are perspective views of panels also of the type shown in FIG. 1 but provided with some of the accessories of FIG. 4;

FIG. 7 is a perspective view of a device consisting of an assembly of two panels of the type shown in FIG. 1 and to which various accessories have been fixed;

FIG. 8 is a perspective view of an assembly comprising a plurality of superposed panels folded to provide a free face stiffened by means of a frame to which various accessories may be fastened as required;

FIG. 9 is a plan view from above showing two modular panels constructed according to a modified form of embodiment of the invention;

FIG. 10 is a simplified perspective view showing two panels according to FIG. 9, but folded;

FIG. 11 is a perspective view showing an assembly of several panels according to FIG. 9 but so constructed that the shape of the final structure resembles that of an igloo.

DESCRIPTION OF THE PREFERRED EMBODIMENTS

The rectangular panel illustrated in FIG. 1 consists of a sheet of suitable semi-rigid plastic material such as polypropylene having an adequate thickness, for example 0.8 mm. The mechanical properties of this plastic sheet are such that it can be folded while having a rigidity sufficient to enable the folded sheet to remain upright on a flat horizontal surface without the assistance of any other supporting means.

This rectangular panel has a series of grooves 3, 4 formed therein by pressing or stamping, so that the panel 1 can be folded in various planes for imparting the desired three-dimensional configuration thereto, with multifarious faces. The longitudinal or meridian groove 2 is formed along a line interconnecting the middle points of the small sides of the rectangle, and grooves 3 and 4 are disposed along lines extending across this meridian line 2 in order to form on either side of this line 2 a plurality of contiguous isosceles triangles 5, 6 having their bases disposed by turns on said meridian line 2 and on the major sides of the rectangle, the vertices of said triangles 5, 6 alternating in the reverse order. These triangles 5, 6 are identical and disposed symmetrically on either side of the meridian line 2. Right-angled triangles 7 are formed between the small sides of panel 1 and the adjacent triangles 5. The vertex angle of each triangle 5, 6 may vary as a function of the desired result and also of the panel size or other factors.

Along the outer periphery of panel 1 folding tabs or lips 8, 9 are formed by means of grooves pressed for this purpose at the intersection of tabs 8, 9 with the contiguous triangles 5, 6 and 7. Identical folding tabs are formed along a same side, and complementary tabs are formed on the opposite side for cooperation with the tabs of the first side; furthermore, on a same side any pair of adjacent tabs 8 or 9 are separated by a V-shaped notch 11. Each tab 8 comprises a tongue 12 adapted to engage a corresponding slit 13 formed in the tab 9 of the opposite side. Finally, each tab 8, 9 has a pair of holes 14 formed therethrough for fixing an accessory, as will be explained presently.

The four corners 15 of panel 1 are cut off at an angle of 45 degrees for permitting like the notches 11 the folding of the panel sections along the various grooves 2, 3 and 4.

To impart the desired three-dimensional configuration to the multi-face device, the panel is firstly folded along its meridian line 2, then in the opposite direction along the various successive grooves 3, 4, including the peripheral grooves separating the folding tabs 8, 9 from the adjacent triangles. With this folding procedure it is thus possible to obtain variuos panel configurations. As shown in FIG. 2, this panel is so folded as to insert the tongues 12 of one of the small sides into the slits 13 of the opposite small side in order to hold the panel in this shape, so that it will stand by itself on its triangular base on a horizontal flat surface. This triangular base, like the upper triangular face of the panel, may be closed if desired by means of an additional triangular plate 16, 10 secured in position by means known per se (not shown in order to simplify the drawing) to the corresponding sides of the panel, for example by means of slits 13 or 14.

The top closing plate 10 comprises an apertures permitting of illuminating the inner space of the panel structure by means of a suitable light source (not shown). Thus, a closed panel structre is obtained which comprises triangular faces 5, 6 adapted to act as a multidirectional lighting device.

FIG. 3 illustrates two panels 18, 18a of different sizes but having a structure similar to that of panel 1, and so folded as to stand by themselves on a flat horizontal surface; these panels 18, 18a are each provided with an open face.

FIG. 4 shows a panel 18 and also a number of accessories intended for use therewith, namely: a detachable rectangular frame 19, a detachable plate 21 adapted to constitute the top of the folded panel and provided with an aperture 22 for introducing a light source into the panel. In this example the plate is trapezoidal but could as well be triangular, square or pentagonal as a function of the panel configuration and applications contemplated.

The light source (not shown) may be secured to the plate 21 by means of a retaining member 23 of a type known per se. The accessories shown in FIG. 4 further comprise a gridspot 24 for limiting the angle of the illuminated area, and this device may be fitted in the frame 19 as shown in the modified version of FIG. 7. The accessories of FIG. 4 further comprise triangular plates 16, 10, 25, 26 of which plates 25 and 26 are smaller than plates 16 and 10, and an orifice for a light source is also formed in plate 26. A rectangular reflecting and opaque plate 27 formed with a central hole 28a may be secured to the minor vertical sides of a panel 1 or 18 (FIG. 5) by using means known per se (not shown), such as dome fasteners, Velcro straps, or the like. Besides, these fastening means may be on the other hand also be used for assembling or securing other accessories among those mentioned hereinabove. FIG. 4 also shows a set of detachable and preferably telescopic legs 29 provided or not with casters 30 and adapted to be fitted to the bottom of the panel for raising same.

FIG. 5 illustrates a panel 1 having folded tabs receiving a plate 27 having a light source 32 disposed in front of its central aperture 28. If desired, this plate 27 may consist of several sections and be foldable.

FIG. 6 illustrates a panel 1 so folded as to comprise an open face and open top and base provided with trapezoidal plates 21.

In the construction shown in FIG. 7 two panels 1 are superposed and the bottom panel, closed by a plate 21 provided with a hole 22, is supported by four legs 29 for heightening the assembly so that a light source (not shown) can be disposed beneath the bottom aperture 22. The lower panel 1 is also provided with a frame 19 having a flexible light diffuser 31 (also shown in FIG. 4) fixed thereto. Another light source 32 is disposed above the top plate 21.

The device shown in FIG. 8 comprises three assembled and superposed folded panels 1 provided along the perimeter of their open front faces with rigid elements 19, 33, 34 (such as rods or suitable perforated anglebars) held in their assembled condition by connecting members 35, 36. Plates 21 may be added to the top and bottom faces of the assembly in order to improve the rigidity thereof and impart a suitable configuration thereto. This device stands by itself on a flat horizontal surface and may be used for diffusing or reflecting light, as desired.

Plates 21 and the rectangular plate 27 may be cut from a same sheet, or if desired in the same sheet as the panel 1 proper.

FIG. 9 illustrates two additional forms of embodiment of the invention wherein the panel has a trapezoidal condiguration. Each trapezoidal panel 37, 38 comprises pressed grooves 39, 41, the latter extending at right angles to the oblique sides of the trapezium and terminating at the vertices of the trangles formed by said grooves.

These panels 37, 38 are provided along their outer periphery with folding tabs (8, 9) simlar to those already described with reference to panel 1.

The grooves 41 and the bases of trapeziums 37, 38 define foldable right-angle triangles adapted to act as support means to the folded panel standing on a horizontal surface. Besides, grooves 39 and 41 define a series of identical triangles so that a panel 37 can be assembled with another panel 38 along complementary tabs or edges (8, 9) of their bases, or along their inclined sides.

The length of the major base of panel 37 is equal to that of the upper minor base of panel 38, and the ratio of length of the major base of panel 38 to that of the minor base of panel 37 is 3:1.

It is thus possible to obtain a closed assembly (FIG. 11) by superposing a plurality of panels 37 interconnected along their oblique sides, and a pluraliy of panels 38, for example five, with a front panel 50, may also be connected and fastened along their upper horizontal sides to the base of the assembly of five panels 37. The resultant structure has a hexagonal top adapted to be closed by a plate 47 formed with an aperture 48 provided with a closing flap 46 permitting the introduction of a camera (not shown) for photographing or filming the subject 49 disposed inside the 'igloo' formed by the assembly 37, 38.

One of said panels 37, 38 may also be provided with an aperture permitting of taking a side view of the subject 49 disposed inside the igloo, but it is more convenient to provide a special panel 50 comprising an aperture 51 and several flaps 46 with separate locking means such as a lace 46b. With these flaps 46, 46a it is possible to take photographs from different angular positions from top to bottom of the subject 49 disposed inside the igloo and illuminated by the external like source 52. Preferably, adjustable means 53 are provided for modifying at will the degree of opening of said aperture 51.

Of course, the width of the igloo may vary as a function of the number and size of the panels constituting this particular structure. If a different number of panels is used, for example series of 3, 4 or 5 triangular, square or pentagonal tops will be obtained, respectively.

FIG. 10 illustrates a panel 37 folded on either side of the central triangular 45 so that it can bear on the supporting horizontal surface with right-angled triangles adjacent its major base, together with a trapezoidal panel 38 so spread out as to stay upright by itself, that is, without resorting to any complementary or external support means, and by its inherent rigidity, as in the case of panel 37.

Some of the advantages resulting from the use of the modular panel and panel assembly according to the instant invention are mentioned hereinafter:

Due to the multiple triangular faces constituting the panel in its spread-out condition, the mechanical strength of the structure is particularly high.

The panel can be folded in many different ways so as to assume as many different configurations around the subject to be photographed or filmed.

Due to its modular construction, the dimensions and configuration of the final device can be changed at will by varying the panel assembly.

This panel is unbreakable and can be folded an infinite number of times without breaking.

The panel can be folded to occupy a minimum space for transport purposes, so that kits of such panels may easily be divided into flat elements adapted to be packed and transported without difficulty.

Furthermore, the panels of this invention are extremely light in weight compared with conventional diffusers made of rigid plastic material having a thickness of the order of 2 mm.

Moreover, no costly supports are necessary, and the three-dimensional configuration of the panels enables them to receive light beams from any possible angular positions, whereas the luminous energy picked up by a flat surface decreases as the angle of incidence approaches this surface. For the same reason, the three-dimensional configuration of the panel of the present invention permits of illuminating a wider angle of a flat surface of same size.

Due to the presence of the folding tabs 8, 9 and of the means provided thereon (11, 12, 14) it is possible to fix a wide range of accessories to the panel sides. It is also possible to secure support means for the light sources for example by means of spring-loaded clamps disposed along the outer peripery of a frame such as 19.

Of course, this invention should not be construed as being strictly limited by the specific forms of embodiment described and illustrated herein, since many modifications and changes may be brought thereto, notably those shown in FIGS. 1 and 9, in each of which the panel has a polygonal (rectangualr or trapezoidal) contour and is divided into one or a plurality of rows of triangles by crossed grooves extending between two opposed panel sides, these triangles alternating in such a manner that their bases extend by turns along one of the initial sides of the crossed grooves and along the opposite side, or along an intermediate line parallel to this last-mentioned side.

I claim:

1. A modular light-diffusing or reflecting plastic panel for photographic, motion picture and television applications, having a polygonal contour, comprising semi-rigid plastic material having therein a plurality of pressed grooves (2, 3, 4, 39, 41) extending along crossed lines interconnecting two opposite sides of the panel and dividing said panel into at least one row of alternately oppositely disposed triangles and securing means along the panel periphery for connecting the panel to at least another similar panel (1) or to an accessory (10, 16, 18, 19, 21, 27, 33, 34).

2. The modular panel of claim 1, having a rectangular configuration (1) and pressed grooves (2, 3, 4) on the one hand along a meridian line interconnecting the middle points of two opposite sides and on the other hand along lines forming on either side of said meridian line a plurality of contiguous triangles (5, 6) having their bases disposed alternately on said meridian line (2) and on the major sides of the panel (1) so as to alternate with the vertices (11) of said triangles, the triangles (7) disposed along the minor sides of the panel being right-angled triangles while the intermediate triangles (5, 6) are isosceles triangles, whereby said panel (1) can be folded in three dimensions in order to have a series of faces in different planes, said faces consisting of said triangles (5, 6, 7).

3. The modular panel of claim 1, having a trapezoidal configuration (37, 38) and groove (39, 41) so directed as to define, on the one hand along the major base of the foldable triangles adapted to support the panel assembly (27, 28) on a horizontal surface, and on the other hand between said triangles, other triangles constituting as many faces when the panel is folded, the number of said other triangles depending on the lengths of the bases of the trapeziums.

4. The modular panel of claim 1, wherein said means provided along its periphery for assembling the panel with other similar panels after folding them or for receiving accessories, comprise folding tabs (8, 9) formed along the edges of the panel and provided with slits to form tongues (12) of contiguous triangles, and other silts (13) adapted to receive and retain the corresponding tongues (12) of the panel (1, 37, 38) after folding said panel in order to keep the panel in the desired configuration, or the tongues of other similar panels for the purpose of assembling them with the modular panel concerned (1, 37, 38), spaced holes being also provided along the folding tabs for fixing miscellaneous accessories to the panel.

5. A device resulting from the assembling of at least two rectangular modular panels as disclosed in claim 1 wherein said panels are so folded as to form an open face between their vertical sides, rectangular frames (19) being mounted on the sides of said face for supporting accessories perforated plates (21) being adapted to be secured to the top and bottom faces of the panel and provided with an aperture permitting the passage of a light source (32), the assembly further comprising supporting legs (29) disposed at spaced intervals under said bottom face.

6. The panel of claim 1 folded to define a free face and wherein a rectangular frame (27) is secured to the sides of said free face and provided with at least one aperture (28) permitting the illumination of the inner space of the panel by means of a light source.

7. A device obtained by assembling a plurality of modular panels according to claim 3 wherein said trapezoidal panels (37, 38) are assembled to constitute a closed volume except at the bottom and top thereof, the front panel (50) having a relatively large aperture (51) formed therein which is adapted to be closed by a cover (47) in which an aperture (48) provided with a flap (46) may be formed if desired.

8. The panel of cl aim 1 which, when folded to enable it to keep upright when laid on a flat horizontal surface while providing an open face between its sides, comprises a rectangualr frame (19; 22, 34) secured to the sides of said face and adapted to support accessories, plates (21) apertured to permit the passage of a light source (32) being secured to the bottom and top faces of the panel (1), and spaced supporting legs (29) secured to said bottom face.

9. The panel of claim 8, wherein said rectangular frame (27) and the plates (21) which are secured to the top and bottom faces of the panel (1), are cut from the same sheet material.

* * * * *